United States Patent

Helwig et al.

Patent Number: 5,210,190
Date of Patent: May 11, 1993

[54] PREPARATION OF TRIAZINYL-BIS-ANTHRAQUINONE DYES BY REACTING ARYLDIHALOTRIAZINE WITH AMINO ANTHRAQUINONE

[75] Inventors: Reinhard Helwig, Gruenstadt; Helmut Hoch; Gerhard Epple, both of Weisenheim, all of Fed. Rep. of Germany

[73] Assignee: BASF Aktiengesellschaft, Ludwigshafen, Fed. Rep. of Germany

[21] Appl. No.: 768,943

[22] PCT Filed: Jun. 27, 1990

[86] PCT No.: PCT/EP90/01030
§ 371 Date: Oct. 22, 1991
§ 102(e) Date: Oct. 22, 1991

[87] PCT Pub. No.: WO91/00317
PCT Pub. Date: Jan. 10, 1991

[30] Foreign Application Priority Data

Jun. 30, 1989 [DE] Fed. Rep. of Germany ........ 3921451

[51] Int. Cl.$^5$ ............... C09B 1/467; C09B 67/28
[52] U.S. Cl. ..................... 544/187; 544/189
[58] Field of Search .................. 544/187, 189

[56] References Cited

U.S. PATENT DOCUMENTS

| | | | |
|---|---|---|---|
| 2,346,726 | 4/1944 | Buxbaum | 552/224 |
| 3,297,695 | 1/1967 | Weidinger et al. | 544/187 X |
| 3,655,638 | 4/1972 | Ulrich et al. | 544/187 X |
| 3,787,406 | 1/1974 | Ulrich et al. | 544/187 |
| 3,839,332 | 10/1974 | Moergeli | 544/187 |
| 3,870,717 | 3/1975 | Ulrich et al. | 544/187 |
| 4,436,906 | 3/1984 | Niwa et al. | 544/187 |
| 4,503,224 | 3/1985 | Harms et al. | 544/187 |
| 4,507,476 | 3/1985 | Niwa et al. | 544/187 |
| 4,515,716 | 5/1985 | Niwa et al. | 544/187 X |

FOREIGN PATENT DOCUMENTS

| | | | |
|---|---|---|---|
| 551884 | 2/1930 | Fed. Rep. of Germany | 544/187 |
| 637937 | 10/1934 | Fed. Rep. of Germany | 544/187 |
| 1099543 | 5/1957 | Fed. Rep. of Germany | 544/187 |
| 1149476 | 3/1959 | Fed. Rep. of Germany | 544/187 |
| 784926 | 3/1956 | United Kingdom | 544/187 |

Primary Examiner—Floyd D. Higel
Attorney, Agent, or Firm—Oblon, Spivak, McClelland, Maier & Neustadt

[57] ABSTRACT

Anthraquinone dyes I

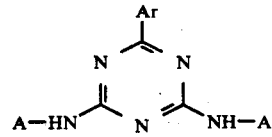

(Ar=aryl, A=anthraquinonyl) are prepared by reacting an aryldihalotriazine II

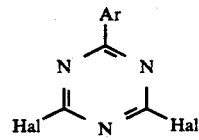

(Hal = chlorine or bromine) with an aminoanthraquinone III

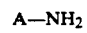

in an N—C$_1$—C$_4$-alkylpyrrolid-2-one or -piperid-2-one, N-di-C$_1$-C$_4$-alkylacetamide or -propionamide or urea derivatives of the formula IV

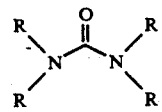

(R = identical or different alkyl groups of from 1 to 4 carbon atoms which can also be linked together to form a 5- or 6-membered ring containing the urea group) as solvent.

4 Claims, No Drawings

PREPARATION OF TRIAZINYL-BIS-ANTHRAQUINONE DYES BY REACTING ARYLDIHALOTRIAZINE WITH AMINO ANTHRAQUINONE

The present invention relates to an improved process for preparing anthraquinone dyes of the general formula I

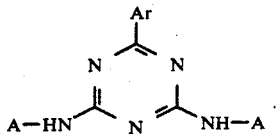

where Ar is aryl and the A radicals are each anthraquinonyl radicals, by reacting an aryldihalotriazine of the general formula II

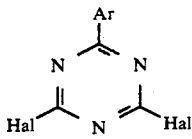

where Hal is chlorine or bromine, with an aminoanthraquinone III

A—NH$_2$  III  

in an organic solvent.

Anthraquinone dyes of the formula I belong to the important group of the vat dyes.

As is already known from DE patents 551,884, 637,937 and 1,026,456, the dyes I are obtainable by reacting the aryldichlorotriazines II with the aminoanthraquinones III in a high-boiling aromatic solvent such as nitrobenzene or di- or trichlorobenzene. However, the yields of from 85 to 90% obtainable with this process are unsatisfactory.

Attempts to improve the process by including bases and a copper(I)amine catalyst (DE patent 1,795,102) had only limited success and in the case of the particularly important dye Vat Blue 66 (Ar = phenyl, A = 1-amino-2-acetylanthraquinon-4-yl) led even to a yield of only 53%.

It is an object of the present invention to make available the dyes I in better yields and in a more economical manner.

We have found that this object is achieved by a process for preparing an anthraquinone dye of the general formula I

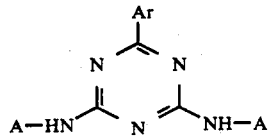

where Ar is aryl and the A radicals are each anthraquinonyl, by reacting an aryldihalotriazine of the general formula II

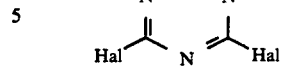

where Hal is chlorine or bromine, with an aminoanthraquinone III

A—NH$_2$       III  

in an organic solvent, which comprises using as solvent for this purpose an N—C$_1$–C$_4$-alkylpyrrolid-2-one, N—C$_1$–C$_4$-alkylpiperid-2-one, N-di-C$_1$–C$_4$-alkylacetamide or N-di-C$_1$–C$_4$-alkylpropionamide or a urea derivative of the formula IV

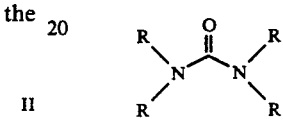

where the radicals R are identical or different alkyl groups of from 1 to 4 carbon atoms which can also be linked to one another to form a 5- or 6-membered ring containing the urea group.

Suitable solvents for the purposes of the present invention are

N-C$_1$–C$_4$-alkylpyrrolid-2-ones such as N-ethyl-, N-n-propyl-, N-isopropyl- or N-n-butyl-pyrrolidone, preferably N-methylpyrrolidone, N-C$_1$C$_4$-alkylpiperid-2-ones, such as N-ethyl-, N-n-propyl-, N-isopropyl- or N-n-butylpiperidone, preferably N-methylpiperidone, urea derivatives of the formula IV with 4 identical or different C$_1$–C$_4$-alkyl groups as radicals R such as tetra-n-propyl-, tetra-n-butyl- or dimethyldiethyl-urea, preferably tetramethyl- or tetraethyl-urea, or with radicals R which link together as ethyleneor propylene-ureas to form a 5- or 6-membered ring containing the urea group, such as 1,3-diethyl- or 1,3-dipropyl-imidazolidin-2-one or 1,3-diethyl- or 1,3-dipropyl-tetrahydro-2(1H)-pyrimidinone, preferably 1,3-dimethylimidazolidin-2-one or 1,3-dimethyl-tetrahydro-2(1H)-pyrimidinone, and N-di-C$_1$–C$_4$-alkyl-acetamides or -propionamides such as diethyl-, di-n-propyl- or di-n-butyl-acetamide or dimethyl-, diethyl-, di-n-propyl- or di-n-butylpropionamide, preferably dimethylacetamide.

These solvents are very potent solvents for the starting materials of the process. Thus, the amount of solvent is in general only 2–6, preferably 2.5–4 kg per kg of III.

The reaction can also be carried out in the presence of acid-binding agents such as the alkali metal salts of weak acids, for example sodium acetate, sodium carbonate or potassium carbonate.

Furthermore, it is also possible to use a catalyst in the form of an addition compound of copper(I) iodide or bromide with a tertiary base such as triethylamine, pyridine or related compounds.

The starting compounds II an III are known or obtainable by known methods. The molar ratio of II to III is advantageously from 0.5:1 to 1:1, in particular from 0.6:1 to 0.8:1.

In general, the reaction is carried out at from 80 to 200° C., preferably at from 100 to 160° C. The reactants can be added alternatively before or after the reaction temperature has been reached. It is also possible to increase the temperature during the reaction in order to achieve complete conversion.

The reaction is in general carried out under atmospheric pressure but can also be carried out under reduced pressure.

The reaction times including the after-stirring times are in general from 5 to 12, preferably from 6 to 8, hours.

The reaction mixture is worked up for the products in a conventional manner, preferably by cooling the solution and separating off the precipitating dyes I and washing them or by distilling the solvent out of the reaction mixture.

The dyes I are obtained in very high purity and distinctly better yield than heretofore.

Since the solvent, after separation from the dyes I, is obtained in a water-free or at least low-water form and thus is readily regenerable, moreover, water pollution is kept to a minimum.

The process of the present invention is of particular importance for those dyes I where Ar is for example chlorophenyl, dichlorophenyl, bromophenyl, tolyl, methoxyphenyl, ethoxyphenyl or dimethylaminophenyl, preferably phenyl, and which are derived from the following aminoanthraquinones III:

1,4-, 1,5-, 1,8- or 2,6-diaminoanthraquinones, 1-amino-4-alkoxyanthraquinones, preferably 1-amino-4-methoxyanthraquinone, 1-amino-4-(or 5)-aroylaminoanthraquinones or chlorine, bromine or methoxy derivatives thereof, preferably 1-amino-5-benzoylaminoanthraquinone, preferably from 1- or 2-aminoanthraquinones or chlorine or bromine derivatives thereof, particularly preferably from 1,4-diamino-2-acetylanthraquinone.

A particularly preferred application of this process is the preparation of the abovementioned Vat Blue 66 dye.

EXAMPLES

Preparation of dyes of the formula

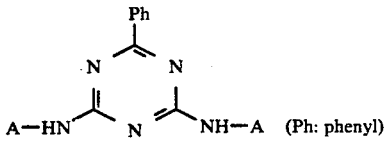  (Ph: phenyl)

A solution of a mol of an aminoanthraquinone III and b g of a solvent S was admixed at $T_1°$ C. with 0.18 mol of 2-phenyl-4,6-dichloro-1,3,5-triazine (II) in the course of 45 min, maintained at $T_1°$ C. for $t_1$ hours and, following a heating-up time of 2 h, subsequently stirred at $T_2°$ C. for $t_2$ hours.

Then the solution was cooled down to 60–70° C., the dye I forming a precipitate. The precipitate was separated off, washed initially with solvent S and then with water and thereafter dried.

The details of these experiments and the results thereof are summarized in the following table:

TABLE

| Example | Anthraquinone III | a mol | Solvent S | b g | $T_1$ °C. | $t_1$ h | $T_2$ °C. | $t_2$ h | Yield of I |
|---|---|---|---|---|---|---|---|---|---|
| 1 | 1,4-diamino-2-acetyl | 0.27 | N-methylpyrrolid-2-one | 250 | 120 | 2.5 | 150 | 2 | 98% |
| 2 | 1,4-diamino-2-acetyl | 0.27 | N-methylpyrrolid-2-one | 190 | 120 | 2.5 | 150 | 2 | 98% |
| 3 | 1,4-diamino-2-acetyl | 0.27 | N-methylpyrrolid-2-one | 375 | 120 | 2.5 | 150 | 2 | 98% |
| 4 | 1,4-diamino-2-acetyl | 0.27 | N-methylpyrrolid-2-one | 250 | 100 | 3 | 150 | 2 | 98% |
| 5 | 1,4-diamino-2-acetyl | 0.27 | N-methylpyrrolid-2-one | 250 | 130 | — | 130 | 4–5 | 98% |
| 6 | 1,4-diamino-2-acetyl | 0.27 | N-methylpyrrolid-2-one | 250 | 160 | — | 160 | 4–5 | 98% |
| 7 | 1,4-diamino-2-acetyl | 0.27 | 1,3-dimethyl-imidazolid-2-one | 250 | 120 | 2.5 | 150 | 2 | 94% |
| 8 | 1,4-diamino-2-acetyl | 0.27 | 1,3-dimethyltetrahydro-2(1H)-pyrimidin-2-one | 250 | 120 | 2.5 | 150 | 2 | 92% |
| 9 | 1,4-diamino-2-acetyl | 0.27 | tetramethylurea | 250 | 120 | 2.5 | 150 | 2 | 92% |
| 10 | 1-amino | 0.24 | N-methylpyrrolid-2-one | 250 | 120 | 2.5 | 150 | 2 | 72% |
| 11 | 2-amino | 0.24 | N-methylpyrrolid-2-one | 250 | 120 | 2.5 | 150 | 2 | 92% |

We claim:

1. A process for preparing an anthrquinone dye of the formula

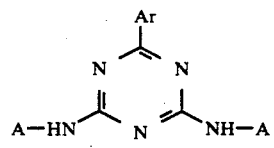

where Ar is aryl and the A radicals are each anthraquinonyl, by reacting an aryldihalotriazine of the formula

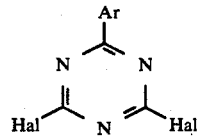

where Hal is chlorine or bromine, with an aminoanthraquinone of the formula

  [III]

in an organic solvent selected from the group consisting of N-$C_1$-$C_4$-alkylpyrrolid-2-one, N-$C_1$-$C_4$-alkylpiperid-2-one, N-di-$C_1$-$C_4$-alkylacetamide, N-di-$C_1$-$C_4$-alkylpropionamide, a urea derivative of the formula

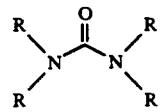

where the radicals R are identical or different alkyl groups of from 1 to 4 carbon atoms, 1,3-di-($C_1$-$C_4$-alkyl)-imidazolidin-2-one and 1,3-di-($C_1$-$C_4$-alkyl)-tetrahydro-2(1H)-pyrimidinone.

2. A process as claimed in claim 1, wherein the organic solvent used is N-methylpyrrolidone, tetramethylurea, tetrathylurea, 1,3-dimethylimidazolidin-2-one, 1,3-dimethyltetrahydro-2(1H)-pyrimidinone or dimethylacetamide.

3. A process as claimed in claim 1 or 2, wherein Ar is phenyl and A is 1-amino-2-acetylanthraquinon-4yl.

4. A process as claimed in claim 1 or 2 or 3, wherein the reaction is carried out at from 80 to 180° C.

* * * * *